United States Patent
Lekovic et al.

(10) Patent No.: US 7,714,030 B2
(45) Date of Patent: May 11, 2010

(54) ATTACHED, HIGH REACTIVITY RIGID POLYURETHANE FOAMS CONTAINING OXAZOLIDONE GROUPS

(75) Inventors: Huzeir Lekovic, Troy, MI (US); Frank V. Billotto, Oakland Township, MI (US)

(73) Assignee: Dow Global Technologies Inc., Midland, MI (US)

( * ) Notice: Subject to any disclaimer, the term of this patent is extended or adjusted under 35 U.S.C. 154(b) by 596 days.

(21) Appl. No.: 11/403,658

(22) Filed: Apr. 12, 2006

(65) Prior Publication Data

US 2007/0059512 A1 Mar. 15, 2007

Related U.S. Application Data

(60) Provisional application No. 60/717,508, filed on Sep. 15, 2005.

(51) Int. Cl.
*C08G 18/08* (2006.01)
(52) U.S. Cl. ........................ 521/170; 521/115; 521/116; 521/117; 521/118; 521/128; 521/129; 521/130; 521/164; 521/167; 521/174
(58) Field of Classification Search ................ 521/115, 521/116, 117, 118, 128, 129, 130, 164, 167, 521/170, 174
See application file for complete search history.

(56) References Cited

U.S. PATENT DOCUMENTS

| | | | |
|---|---|---|---|
| 3,313,747 A * | 4/1967 | Schramm | .............. 521/161 |
| 4,022,721 A | 5/1977 | Ashida | |
| 4,129,695 A | 12/1978 | Bonin | |
| 4,568,703 A | 2/1986 | Ashida | |
| 4,699,931 A | 10/1987 | Fuzesi et al. | |
| 4,766,158 A | 8/1988 | Fuzesi et al. | |
| 5,789,451 A * | 8/1998 | Guidetti et al. | .............. 521/51 |
| 5,817,860 A | 10/1998 | Rizk et al. | |
| 6,284,812 B1 * | 9/2001 | Rotermund et al. | ......... 521/174 |
| 6,423,755 B1 | 7/2002 | Allen et al. | |
| 6,541,534 B2 | 4/2003 | Allen et al. | |

FOREIGN PATENT DOCUMENTS

| | | |
|---|---|---|
| CA | 2028678 | 5/1991 |
| EP | 296 052 A1 | 6/1988 |
| WO | WO 02/079340 A1 | 10/2002 |
| WO | WO 03/037948 A1 | 5/2003 |

* cited by examiner

*Primary Examiner*—John Cooney

(57) ABSTRACT

Polyurethane foams are made and attached to a substrate having an open cavity, but reacting a polyisocyanate component and a polyol component in the presence of a blowing agent. The polyisocyanate component includes at least one isocyanate-terminated, oxazolidone-containing intermediate. This process allows for very fast curing, good quality, adherent foams to be produced on, for example, vehicle parts and assemblies, for acoustical or vibration dampening and for structural reinforcement.

11 Claims, No Drawings

ATTACHED, HIGH REACTIVITY RIGID POLYURETHANE FOAMS CONTAINING OXAZOLIDONE GROUPS

CROSS-REFERENCE TO RELATED APPLICATION

This application claims benefit of U.S. Provisional Application 60/717,508, filed Sep. 15, 2005.

BACKGROUND OF THE INVENTION

The present invention relates to rigid polyurethane foams, particularly rigid polyurethane foams that are useful as reinforcement materials, such as in the auto industry.

Polyurethane foams have been used in the auto and other industries for a number of purposes. For example, rigid foams have been used for structural reinforcement, preventing corrosion and damping sound and vibration. These foams are typically formed by applying a reactive foam formulation to a part and allowing the formulation to foam in place. The part is often already assembled onto a vehicle when the foam is applied. This means that the foam formulation must be easy to mix and dispense, must cure rapidly before it runs off the part, and preferably initiates curing at moderate temperatures. To minimize worker chemical exposure, the formulation is preferably is low in volatile organic compounds, especially volatile isocyanates and amines. The individual components are preferably storage-stable at room temperature for an extended period.

One foaming system for these applications is based on the prepolymer described by Rizk et al. in U.S. Pat. No. 5,817,860. The prepolymer described in that patent is made by reacting an isocyanate with a monofunctional alcohol and a polyol. Foams are made from this prepolymer by reacting it with water. While good quality rigid foam can be made using this approach, it has several drawbacks. First, because the prepolymer is cured with a water stream, the volume ratio of the reactants (prepolymer and water) is often quite high, such as 15:1 or more. Much of the commercially available dispensing equipment cannot handle such high component ratios. Second, in order to get a sufficiently fast reaction with this system, it is often necessary to preheat the components to temperatures of 80° C. or more. This increases energy costs, exposes workers to high temperature reactants and reduces the viscosity of the system, thereby promoting run-off.

Approaches for improving or modifying the system of U.S. Pat. No. 5,817,860 are described in WO 02/079340A1, WO 03/037948A1 and U.S. Pat. Nos. 6,541,534 and 6,423,755. These approaches include the use of special acrylate- or methacrylate-functional materials to allow for lower curing temperatures, and the use of hollow microspheres to balance density and compressive strength.

Another approach is to prepare the foam from an epoxy resin. Epoxy resins have the advantage of superior thermal properties. However, epoxy resins suffer from several problems, including a slow cure, a large exotherm and brittleness. As a result, epoxy foams are ill-suited for many applications, particularly vehicular reinforcement applications.

Because a fast cure is needed in many of these applications, a continuing desire is to further increase the rate at which the foam system cures. Faster cure allows lower viscosity components to be used, as the fast cure causes the foam formulation to set before it has time to run off when applied to a substrate. Lower viscosity components are often more easily mixed, and require less energy and frequently less robust equipment to dispense them. However, the achievement of a faster cure must not come at the expense of a desirable foam density and necessary physical properties.

Very rapid cures can be obtained by increasing catalyst levels and/or using highly reactive components. The problem with these approaches is that they disorder the sequencing of the blowing and gelling reactions. This causes the foam to have a higher-than-expected density, poor physical properties, and sometimes an incomplete cure.

It would therefore be desirable to provide a rigid polyurethane system that cures very rapidly to a good quality, rigid form, particularly one that can be applied at lower volume ratios and can be applied at moderate operating temperatures.

SUMMARY OF THE INVENTION

In one aspect, this invention is a method of forming a rigid polyurethane foam attached to an open cavity of a substrate, comprising mixing a polyisocyanate component with a polyol component in the presence of a blowing agent and at least one catalyst for the reaction of a polyol with a polyisocyanate, dispensing the resulting mixture into the cavity of the substrate and subjecting the mixture to conditions sufficient to cause it to cure to form a foam having a bulk density of 1.5 to 40 pounds per cubic foot (24-640 kg/m$^3$) that is adherent to the substrate, wherein
(a) the polyisocyanate component contains a prepolymer containing oxazolidone groups and free isocyanate groups,
(b) the polyol component contains isocyanate-reactive materials that have an average functionality of at least about 2.0 and include at least one polyol, and
(c) the ratio of isocyanate groups in the polyisocyanate component to the number of isocyanate-reactive groups in the polyol component is from about 0.7:1 to about 1.5:1.

In another aspect, this invention is a rigid polyurethane foam which is the reaction product of a reaction mixture containing an oxazolidone-containing, isocyanate-terminated prepolymer, a polyol component and at least one blowing agent, wherein the ratio of isocyanate groups in the polyisocyanate component to the number of isocyanate-reactive groups in the polyol component is from about 0.7:1 to about 1.5:1, and further wherein the rigid foam is essentially free of isocyanurate groups.

In another aspect, this invention is a rigid polyurethane foam which is the reaction product of a reaction mixture containing an oxazolidone-containing, isocyanate-terminated prepolymer, a polyol component and at least one blowing agent, wherein the blowing agent includes at least one carbamate of an alkanolamine.

In another aspect, this invention is a process for preparing a rigid polyurethane foam, comprising mixing a polyisocyanate component with a polyol component in the presence of a blowing agent and at least one catalyst for the reaction of a polyol with a polyisocyanate, and subjecting the mixture to conditions sufficient to cause it to cure to form a foam having a bulk density of 1.5 to 40 pounds per cubic foot (24-640 kg/m$^3$), wherein (1) the polyisocyanate component includes an oxazolidone-containing, isocyanate-terminated prepolymer that is essentially free of isocyanurate groups, (2) the ratio of isocyanate groups in the polyisocyanate component to the number of isocyanate-reactive groups in the polyol component is from about 0.7:1 to about 1.5:1 and (3) the mixture is essentially free of a catalyst for the formation of isocyanurate groups.

This invention provides for a rigid polyurethane foam formulation that cures rapidly to form a foam that adheres well to various substrates, exhibits a minimal amount of sag, is not highly friable, and has excellent heat resistance. The invention is especially suitable for making foamed-in-place reinforcing, or sound- or vibration-dampening foam, especially for automotive applications, as it is easily foamed in place where reinforcement is needed.

DETAILED DESCRIPTION OF THE INVENTION

The foam formulation includes a polyisocyanate component, a polyol component and a blowing agent as described below.

The polyisocyanate component includes a polyisocyanate compound or mixture thereof. At least one of the polyisocyanate compounds is an intermediate that contains free isocyanate groups and oxazolidone groups. Typically, the intermediate will be present as a mixture with other polyisocyanate compounds that do not contain oxazolidone groups. In general, the polyisocyanate compounds will contain on average from about 0.05 to about 1.0 oxazolidone group/isocyanate group. The high end of this range is represents the case in which one mole of a diepoxide is reacted with two moles of a diisocyanate compound. More typically, about 0.05 to about 0.33, especially from about 0.05 to about 0.18 equivalents of oxazolidone groups are present per equivalent of isocyanate groups in the polyisocyanate compound(s).

The intermediate is conveniently formed in the reaction of an excess of a polyisocyanate compound with a polyepoxide. Equivalent ratios of polyepoxide compound to polyisocyanate compound are generally from about 0.05 to about 0.5:1, preferably from about 0.05 to about 0.25:1, and even more preferably from about 0.05 to about 0.15:1. The product of this reaction is an oxazolidone-containing intermediate, usually in admixture with unreacted quantities of the starting polyisocyanate compound.

The reaction of a polyepoxide with a polyisocyanate to form an oxazolidone-containing material is well-known. Suitable conditions for the reaction of a polyepoxide and a polyisocyanate to form an oxazolidone are described, for example, in U.S. Pat. Nos. 4,022,721, 4,766,158 and 4,568, 703. Those conditions generally include the presence of a suitable catalyst and heating to an elevated temperature, for example from 40-200° C., especially from 70-150° C., for a period of up to several hours. The reaction is preferably conducted until the epoxide groups of the polyepoxide are essentially all consumed. The reaction is preferably conducted under an inert atmosphere such as nitrogen or argon.

The reaction conditions are preferably selected to minimize or avoid the formation of isocyanurate groups in the intermediate. Isocyanurate formation is most easily prevented by excluding strong trimerization catalysts from the reaction mixture, and to a lesser extent by using moderate reaction temperatures. The polyisocyanate component preferably contains less than 0.05, especially less than 0.025, and preferably less than 0.01, equivalents of isocyanurate groups per equivalent of isocyanate groups.

At least one organic polyisocyanate compound is used in preparing the intermediate. The organic polyisocyanate is preferably one which is devoid of isocyanurate linkages, and more preferably is also devoid of urethane linkages. Suitable polyisocyanate compounds include aromatic, aliphatic and cycloaliphatic polyisocyanates. Aromatic polyisocyanates are generally preferred based on cost, availability and properties, although aliphatic polyisocyanates are preferred in instances where stability to light is important. Exemplary polyisocyanate compounds include, for example, m-phenylene diisocyanate, 2,4- and/or 2,6-toluene diisocyanate (TDI), the various isomers of diphenylmethanediisocyanate (MDI), the so-called polymeric MDI products (which are a mixture of polymethylene polyphenylene isocyanates in monomeric MDI), carbodiimide-modified MDI products (such as the so-called "liquid MDI" products which have an isocyanate equivalent weight in the range of 135-170), hexamethylene-1,6-diisocyanate, tetramethylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethyoxy-4,4'-biphenyl diisocyanate, 3,3'-dimethyldiphenyl methane-4,4'-diisocyanate, 4,4',4"-triphenylmethane diisocyanate, hydrogenated polymethylene polyphenylisocyanates, toluene-2,4,6-triisocyanate and 4,4'-dimethyldiphenylmethane-2,2',5,5'-tetraisocyanate. Especially suitable polymeric MDI products have a free MDI content of from about 5 to about 40% by weight, more preferably about 10 to about 25% by weight, and have an average functionality (number of isocyanate groups per molecule) of about 2.7 to 4.0, more preferably about 2.8 to about 3.4. Such polymeric MDI products are available from The Dow Chemical Company under the trade name PAPI®.

The polyepoxide used to make the prepolymer has an average of at least about 1.8, preferably of at least about 2.0, epoxide groups per molecule. If a mixture of polyepoxides is used, it is preferred that each polyepoxide in the mixture contains at least 1.8 epoxy groups/molecule.

The polyepoxide(s) may be solid or liquid at room temperature. If a solid, the polyepoxide is preferably heat softenable at an elevated temperature of between about 50° C. and 150° C. Mixtures of solid and liquid (at room temperature) polyepoxides can be used.

The polyepoxide or mixture thereof suitably has an average epoxide equivalent weight of from 150 to 800, especially 170 to 400 and more preferably 170 to 250. Individual polyepoxides contained in a mixture may have equivalent weights outside of that range.

A wide variety of polyepoxide compounds, such as cycloaliphatic epoxides, epoxidized novolac resins, epoxidized bisphenol A or bisphenol F resins, butanediol polyglycidyl ether, neopentyl glycol polyglycidyl ether or flexibiizing polyepoxides can be used, but generally preferred on the basis of cost and availability are liquid or solid glycidyl ethers of a bisphenol such as bisphenol A or bisphenol F. Halogenated, particularly brominated, polyepoxides can be used to impart flame retardant properties if desired. Polyepoxides of particular interest are polyglycidyl ethers of bisphenol A or bisphenol F having an epoxy equivalent weight of about 1500 to about 800. Blends of one or more polyglycidyl ethers of bisphenol A or bisphenol F with an epoxy-terminated polyalkylene oxide, particularly an epoxy-terminated poly(propylene oxide) are of particular interest. The epoxy resin may be halogenated (in particular, brominated) if desired in order to impart flame resistance.

Suitable polyepoxides are commercially available. Among these are liquid polyepoxides such as D. E. R. 317, D. E. R. 330, D. E. R. 331, D. E. R. 332, D. E. R. 336, D. E. R. 337 and D. E. R. 383, solid polyepoxides such as D. E. R. 642U, D. E. R. 661, D. E. R. 662, D. E. R 663, D. E. R. 671, D. E. R. 672U, D. E. R. 692, D. E. R. 6155, D. E. R. 666E, D. E. R. 667-20, D. E. R. 667E, D. E. R. 668-20, D. E. R. 669-60, D. E. R. 669E and D. E. R 6225, brominated polyepoxides such as D. E. R. 542, D. E. R. 560 and D. E. R. 593, polyglycol diepoxides such as D. E. R. 732, D. E. R. 736, D. E. R. 750 and D. E. R. 755, and epoxy novalac resins such as D. E. N. 425, D. E. N. 431, D. E. N 438 and D. E. N. 439, all available from The Dow. Chemical Company.

The reaction of the polyepoxide and the polyisocyanate usually requires a catalyst. A variety of catalysts for this reaction are known, including quaternary ammonium halides as described in U.S. Pat. No. 3,313,747, certain Lewis acids as described by Sandler, *J. Polymer Science A*-1, Vol. 5, 1481 (1967), certain lithium compounds as described by Gulbins et al., *Chem. Ber.* 93, 1975 (1960) and Dileone, *J. Polymer Science A*-1, Vol. 8, 609 (1970); Lewis acid/Lewis base complexes in which the Lewis base is an ether, thioether, amine, lactam, N-alkyl lactam, N-alkyl amide or certain phosphorous or sulfur compounds, as described in U.S. Pat. No. 4,022,721; and certain antimony complexes, including triphenyl antimony/iodine complexes. The amount of catalyst is used to provide a reasonable reaction rate and high degree of conversion of the epoxide groups to oxazolidone groups, with minimal or no trimerization of the polyisocyanate compounds.

Taken together, the polyisocyanate-containing materials in the polyisocyanate component advantageously have an average isocyanate equivalent weight of from about 150, preferably from about 175, to about 500, preferably to about 350, more preferably to about 250. These isocyanate equivalent weights correspond to —NCO contents of from about 28-8.4%, preferably from 24-12%, more preferably from about 24-16.8% by weight.

The polyisocyanate component may contain a plasticizer. The plasticizer may also be added after the prepolymer is made, or may be present during its formation. A plasticizer may perform several functions, such as reducing viscosity so the polyisocyanate component is easier to process and handle, modifying the rate of the foaming reaction, or softening or otherwise modifying the physical properties of the resulting polyurethane foam. The plasticizer is generally devoid of groups that react with the other components of the foam formulation. Examples of plasticizers include phthalates (e.g., dioctyl phthalate, diisooctyl phthalate, dimethyl phthalate, dibutyl phthalate and mixtures of phthalates, such as those sold by BASF Corporation, Mt Olive, N.J., under the trade name PLATINOL™ (such as Platinol™ 79P)), phosphates (e.g., tributyl phosphate, triphenyl phosphate and cresyl diphenyl phosphate), chlorinated biphenyls, and aromatic oils such as VYCUL™ U-V (sold by Crowley Chemicals) and Jayflex™ L9P (sold by Exxon Chemicals). The amount of plasticizer, when employed, may range over a wide range depending on the foam properties desired. Generally, the plasticizer, when present, constitutes from about 1 percent to at most about 50, preferably from about 15 to about 45 percent, by weight of the polyisocyanate component.

The prepolymer may also be prepared in the presence of a surfactant, such as those described by U.S. Pat. No. 4,390,645, incorporated by reference. The surfactant is typically used if desired to help compatibilize the other components used in making the prepolymer. In addition, the surfactant may be one that plays a beneficial role in forming a foam from the prepolymer. Examples of surfactants include nonionic surfactants and wetting agents, such as those prepared by the sequential addition of propylene oxide and then ethylene oxide to propylene glycol, solid or liquid organosilicones, polyethylene glycol ethers of long chain alcohols, tertiary amine or alkylolamine salts of long chain alkyl acid sulfate esters, alkyl sulfonic esters and alkyl arylsulfonic acids. The surfactants prepared by the sequential addition of propylene oxide and then ethylene oxide to propylene glycol are preferred, as are the solid or liquid organosilicones. Non-hydrolyzable liquid organosilicones are more preferred. When a surfactant is used, it is typically present in an amount of about 0.0015 to about 1 percent by weight of the prepolymer component.

The fully formulated polyisocyanate component advantageously has an isocyanate equivalent weight of from about 150, preferably from about 175, to about 750, preferably to about 500, more preferably to about 400. The isocyanate functionality (exclusive of non-reactive materials such as plasticizers, surfactants and the like) is advantageously at least about 2.0, preferably at least 2.5, to about 4.0, preferably to about 3.5, more preferably to about 3.2 isocyanate groups/molecule on average.

The polyisocyanate component also may contain less than 25%, more preferably less than about 15%, especially 5% by weight or less of isocyanate-containing compounds having a molecular weight of 300 or less. Having such a low monomeric isocyanate content substantially reduces the risks of polyisocyanate inhalation exposure, so costly engineering controls such as downdraft ventilation can be substantially reduced or potentially eliminated.

The polyol component includes a polyol or mixture of polyols. The polyol component will most typically include a blend of two or more different polyols. The functionality (average number of isocyanate-reactive groups/molecule) of the polyol component (including polyols, water (if present) and amine-functional compounds as described below, but exclusive of non-isocyanate reactive materials (if present)) is at least about 2.0, preferably at least 2.3 and more preferably at least 2.5.

Suitable polyols are compounds having at least two isocyanate-reactive hydroxyl groups per molecule, provided that the polyol component has an average functionality of at least about 2.0, preferably at least 2.3 and more preferably at least about 2.5, to about 6.0, preferably to about 4.0. The functionality of the individual polyols preferably ranges from about 2 to about 12, more preferably from about 2 to about 8. The hydroxyl equivalent weight of the individual polyols may range from about 31 to about 2000 or more. Preferably, the hydroxyl equivalent weight of the individual polyols is from about 31 to about 500, more preferably from about 31 to about 250, even more preferably from about 31 to about 200.

Suitable polyols include compounds such as alkylene glycols (e.g., ethylene glycol, propylene glycol, 1,4-butane diol, 1,6-hexanediol and the like), glycol ethers (such as diethylene glycol, triethylene glycol, dipropylene glycol, tripropylene glycol and the like), glycerine, trimethylolpropane, tertiary amine-containing polyols such as triethanolamine, triisopropanolamine, ethylene oxide and/or propylene oxide adducts of ethylene diamine, toluene diamine and the like, polyether polyols, polyester polyols, and the like. Among the suitable polyether polyols are polymers of alkylene oxides such as ethylene oxide, propylene oxide and 1,2-butylene oxide or mixtures of such alkylene oxides. Preferred polyethers are polypropylene oxides or polymers of a mixture of propylene oxide and a small amount (up to about 12 weight percent) ethylene oxide. These preferred polyethers can be capped with up to about 30% by weight ethylene oxide.

Polyester polyols are also suitable. These polyester polyols include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of about 150 or less and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols such as those sold by The Dow Chemical Company under the trade name "Tone" are also useful.

It is preferred that the polyol component includes a tertiary amine-containing polyol and/or an amine-functional compound. The presence of these materials tends to increase the reactivity of the polyol component during the early stages of its reaction with the polyisocyanate component. This in turn helps the reaction mixture to build viscosity more quickly when first mixed and applied without unduly decreasing cream time, and thus reduces run-off or leakage.

Such tertiary amine-containing polyols include, for example, triisopropanol amine, triethanolamine and ethylene and/or propylene oxide adducts of ethylene diamine, toluene diamine or aminoethylpiperazine having a molecular weight of up to about 800, preferably up to about 400. Also of interest are the so-called "Mannich" polyols, which are the alkoxylated reaction products of a phenol, formaldehyde and a secondary amine. When present, tertiary amine-containing polyols may constitute a minor or a major component of the polyol component. (In this invention, a "major" or "main" amount or a "major" or "main" component is one constituting at least 50 weight percent of the polyol component as a whole.) For example, the tertiary amine-containing polyol may constitute from about 1 to about 80% or 50-80% by weight of the polyol component.

The amine-functional compound is a compound having at least two isocyanate-reactive groups, of which at least one is a primary or secondary amine group. Among these are monoethanolamine, diethanolamine, monoisopropanol amine, diisopropanol amine and the like, and aliphatic polyamines such as aminoethylpiperazine, diethylene triamine, triethylene tetraamine and tetraethylenepentaamine. Also included among these compounds are the so-called aminated polyethers in which all or a portion of the hydroxyl groups of a polyether polyol are converted to primary or secondary amine groups. Suitable such aminated polyethers are sold by Huntsman Chemicals under the trade name JEFFAMINE®. Typical conversions of hydroxyl to amine groups for these commercial materials range from about 70-95%, and thus these commercial products contain some residual hydroxyl groups in addition to the amine groups. Preferred among the aminated polyethers are those having a weight per isocyanate-reactive group of about 100 to 1700 daltons, especially about 100 to 250 daltons, and having 2 to 4 isocyanate-reactive groups per molecule.

These amine-functional compounds advantageously constitute no greater than about 30 weight percent, preferably from about 0.25 to about 15 weight percent, especially from about 1 to about 5 weight percent of the total weight of the polyol component.

In order to impart toughness to the foam, a minor amount of a high (i.e. 800 or higher, preferably about 1500-3000) equivalent weight polyol may be added to the polyol component, as well. This high equivalent weight polyol is preferably a polyether polyol having two to three hydroxyl groups per molecule. It more preferably is a poly(propylene oxide) that may be end-capped with up to 30% (by weight of the polyol) of poly(ethylene oxide). The high equivalent weight polyol may contain dispersed polymer particles. These materials are commercially known and are commonly referred to as "polymer polyols" (or, sometimes "copolymer polyols"). The dispersed polymer particles may be, for example, polymers of a vinyl monomer (such as styrene, acrylonitrile or styrene-acrylonitrile particles), polyurea particles or polyurethane particles. Polymer or copolymer polyols containing from about 2 to about 50% or more by weight dispersed polymer particles are suitable. When used, this polymer or copolymer polyol may constitute up to about 45%, preferably from about 5 to about 40%, of the weight of all isocyanate-reactive materials in the polyol component.

The polyisocyanate and polyol components are reacted in the presence of at least one blowing agent. A wide variety of blowing agents can be used, including water, various hydrocarbons, various hydrofluorocarbons, a variety of chemical blowing agents that produce nitrogen or carbon dioxide under the conditions of the foaming reaction, and the like.

Preferably, the blowing agent includes a carbamate of an amine that contains at least one hydroxyl group. The amine preferably also contains at least one, preferably one or two, ether groups per molecule. Suitable carbamates are conveniently prepared by reacting an alkanolamine with carbon dioxide, as described, for example, in U.S. Pat. Nos. 4,735,970, 5,464,880, 5,587,117 and 5,859,285, all incorporated herein by reference. Alkanolamines of interest include, for example, N-methyl-2-aminoethanol, N-ethyl-2-aminoethanol, 2-(2-N-methyl-aminoethyl)-1,2-ethanediol, N,N'-bis-(β-hydroxyethyl)-ethylenediamine, N,N'-bis-(β-hydroxypropyl)ethylene diamine, N,N'-bis-(β-hydroxyethyl)-1,2-propylene diamine, N,N'-bis-(β-hydroxypropyl)-1,3-propane diamine, N,N'-bis-(β-hydroxyethyl)-1-methyl-2,4- and -2,6-diaminocyclohexane, N,N'-bis-(β-hydroxypropyl)-p-xylylene diamine, N-(β-hydroxyethyl-N'-(β-hydroxypropyl) ethylene diamine or tris-(β-hydroxyethyl)-1,6,11 triaminoundecane. Other suitable alkanolamines have the general structure

$$HR^1N-(CR^2R^3)_n-OH \quad (I)$$

where $R^1$ is hydrogen, a $C_1$-$C_5$ alkyl group or a group of the structure $(CR^2R^3)_n$, $R^2$ are each independently hydrogen or $C_1$-$C_5$ alkyl groups and n is an integer from 2 to 6.

Especially preferred alkanolamines have the structure

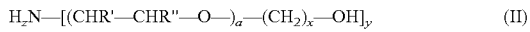

$$H_2N-[(CHR'-CHR''-O-)_a-(CH_2)_x-OH]_y \quad (II)$$

where y is at least one, z+y equals 3, R' and R" are independently hydrogen, ethyl or methyl, x is a number from 1 to 4, and a is 1 or 2, provided that a times y is not greater than 2. Especially preferred alkanolamines of this type are 2-(2-aminoethoxy)ethanol and 2(2-(2-aminoethoxyl)ethoxy)ethanol.

The carbamate is conveniently contained in a non-aqueous liquid medium in order to reduce its viscosity to a desirable level. By "non-aqueous", it is meant that the liquid medium contains less than 0.5 weight percent water, preferably less than 0.2 weight percent water. The liquid medium may be an aprotic or a protic material. Protic materials are, for purposes of this invention, those that contain isocyanate-reactive groups, particularly one or more hydroxyl groups. Diol and triol liquid media are preferred, such as an alkylene glycol or triol, a polyoxyalkylene diol or triol such as a poly(oxyethylene) glycol or triol or a poly(oxypropylene) glycol or triol. The diol or triol preferably has a molecular weight from about 31 to about 1000, preferably from 31 to 600 and more preferably from 31 to about 400. Examples of suitable diols and triols include ethylene glycol, 1,2- or 1,3-propane diol, 1,5-pentane diol, 1,2-, 1,3- or 1,4-butanediol, glycerine, diethylene glycol, dipropylene glycol, and ethylene oxide, propylene oxide or butylene oxide adducts of any of these. The liquid medium may constitute from 5 to 95%, preferably about 25-75%, and more preferably from about 40-60% of the combined weight of medium and carbamate.

The carbamate can be prepared using methods described in U.S. Pat. Nos. 4,735,970, 5,464,880, 5,587,117 and 5,859,285. In general, carbon dioxide is combined with the amine under atmospheric or superatmospheric pressure, at a temperature from 0 to 100° C., in the presence of the liquid medium (if any). Temperatures in the range of 0 to 40° C. are preferred. As the reaction is often exothermic, cooling or other temperature control means may be employed to moderate the temperature. Up to a stoichiometric amount of carbon dioxide may be used. However, it is possible to use less than a stoichiometric level of carbon dioxide, in which case some unreacted amine may remain in the carbamate mixture.

A suitable commercially available carbamate mixture is Specflex™ NR 566, available from The Dow Chemical Company. This product contains a carbamate of an alkanolamine of structure II above, and contains about 45% of a glycol liquid medium.

The carbamate may be the sole blowing agent. In such cases, enough of the carbamate is used to provide the foam with the desired density. When used as the sole blowing agent, foam densities in the range of about 10 to about 40 pounds/cubic foot (160-640 kg/m$^3$) can be easily prepared. Preferred foam densities are about 10 to about 25 pounds/cubic foot (192-400 kg/m$^3$) when the carbamate is the sole blowing agent. On a neat basis (i.e., exclusive of any liquid medium that may be present), suitable amounts of carbamate are from about 0.5 to about 10 parts by weight per 100 parts by weight polyol component. A more suitable range is from about 0.75 to about 5 parts of carbamate per 100 parts by weight polyol component.

Other blowing agents as described before may be used in conjunction with the carbamate compound. Water is a useful auxiliary blowing agent, as it will react with isocyanate groups on the prepolymer to generate carbon dioxide and crosslink the polymer. Somewhat lower foam densities, as low as 1.5 pounds/cubic foot or lower, preferably as low as 3 pounds/cubic foot, can be obtained when auxiliary blowing agents are used. It is preferred to use the amounts of carbamate blowing agent indicated before, even when an additional blowing agent is present, in order to obtain a system that reacts very quickly when the polyol and polyisocyanate components are mixed.

A catalyst for the reaction of a polyol with an isocyanate will in most cases be is used in the method of the invention. Most typically, this catalyst will be incorporated into the polyol component, but in some cases can be mixed into the polyisocyanate component or added as a separate stream.

Suitable catalysts include those described by U.S. Pat. No. 4,390,645, incorporated herein by reference. Representative catalysts include:

(a) tertiary amines, such as trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl) ether, bis(2-dimethylaminoethyl)ether, morpholine,4,4'-(oxydi-2,1-ethanediyl)bis and triethylenediamine;

(b) tertiary phosphines, such as trialkylphosphines and dialkylbenzylphosphines;

(c) chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni;

(d) acidic metal salts of strong acids, such as ferric chloride, stannic chloride, stannous chloride, antimony trichloride, bismuth nitrate and bismuth chloride;

(e) strong bases, such as alkali and alkaline earth metal hydroxides, alkoxides and phenoxides;

(f) alcoholates and phenolates of various metals, such as Ti(OR)$_4$, Sn(OR)$_4$ and Al(OR)$_3$, wherein R is alkyl or aryl, and the reaction products of the alcoholates with carboxylic acids, beta-diketones and 2-(N,N-dialkylamino)alcohols;

(g) salts of organic acids with a variety of metals, such as alkali metals, alkaline earth metals, Al, Sn, Pb, Mn, Co, Ni and Cu including, for example, sodium acetate, stannous octoate, stannous oleate, lead octoate, metallic driers, such as manganese and cobalt naphthenate; and (h) organometallic derivatives of tetravalent tin, trivalent and pentavalent As, Sb and Bi and metal carbonyls of iron and cobalt.

Tertiary amine catalysts are preferred, and especially preferred are the so-called "reactive" amine catalysts that contain a hydroxyl or primary or secondary amine group that can react with an isocyanate to become chemically bonded into the foam. Among these especially preferred catalysts are N,N,N-trimethyl-N-hydroxyethyl-bis (aminoethyl) ether (available from Huntsman Chemical under the trade name ZF-10) and dimethyl 1-2 (2-aminoethoxy) ethanol (available from Nitrol-Europe under the trade name NP-70), and those sold by Air Products under the trade names Dabco™ 8154 and Dabco™ T.

As before, catalysts which strongly promote the formation of isocyanurate groups in the foam are less desired and preferably absent.

The amount of catalyst is selected in conjunction with the other components to provide a desired reactivity. It is generally preferred to formulate the foam formulation in order to achieve a very fast cream time. The cream time, i.e., that time after mixing the polyisocyanate and polyol components that elapses before a visible reaction occurs, is preferably 2 seconds or less, more preferably 1.5 seconds or less and even more preferably 1 second or less. The amount of catalyst needed will depend somewhat on the particular catalyst and the nature of the other components in the formulation. For example, the total amount of catalyst used may be about 0.0015 to about 5, preferably from about 0.01 to about 1 percent by weight.

In addition, the polyol component and/or the prepolymer component can contain various auxiliary components as may be useful in making a rigid foam, such as surfactants, fillers, colorants, odor masks, flame retardants, biocides, antioxidants, UV stabilizers, antistatic agents, thixotropic agents and cell openers.

Suitable surfactants include commercially available polysiloxane/polyether copolymers such as Tegostab (trademark of Goldschmidt Chemical Corp.) B-8462 and B-8404, and DC-198 and DC-5043 surfactants, available from Dow Corning.

Examples of suitable flame retardants include phosphorous compounds, halogen-containing compounds and melamine.

Examples of fillers and pigments include calcium carbonate, titanium dioxide, iron oxide, chromium oxide, azo/diazo dyes, phthalocyanines, dioxazines and carbon black.

Examples of UV stabilizers include hydroxybenzotriazoles, zinc dibutyl thiocarbamate, 2,6-ditertiarybutyl catechol, hydroxybenzophenones, hindered amines and phosphites.

Examples of cell openers include silicon-based antifoamers, waxes, finely divided solids, liquid perfluorocarbons, paraffin oils and long chain fatty acids.

The foregoing additives are generally used in small amounts, such as from about 0.01 percent to about 1 percent by weight of the polyisocyanate component.

Foam according to the invention is prepared by mixing the polyol and polyisocyanate components in the presence of the catalyst and carbamate (and other, optional ingredients) and allowing the reactants to react and form a foam. Although this invention is not limited to any theory, it is believed that the carbamate reacts very rapidly with isocyanate groups, releasing $CO_2$ simultaneously with forming a urea linkage to the isocyanate group. Because a single reaction causes both gelling and blowing, sequencing these reactions ceases to be a significant problem. Initial viscosity build is very fast due to the reaction of the isocyanate groups with the amine groups liberated from the carbamate. This allows the generated gas to be entrained in the reacting mixture and therefore cause it to expand.

Another advantage of this invention is that these very fast cream times can be obtained even when the components are mixed at ambient to moderately elevated temperatures, such as from about 20 to about 75° C., preferably from about 20-60° C. This simplifies handling and applying the foam.

The foam formulation in addition preferably has a tack-free time of less than 20 seconds, preferably less than 15 seconds and more preferably from about 9-12 seconds.

The foam formulation cures, generally without the further application of additional heat or energy for curing, although heating can be used if desired to speed the cure. It is usually not necessary to apply heat to effect a full expansion and cure.

The ratios of the polyisocyanate and polyol components are advantageously selected so as to provide an isocyanate index (ratio of NCO to isocyanate-reactive groups) of about 0.7, preferably about 0.85, more preferably about 0.95, to about 1.5, preferably to about 1.35, more preferably to about 1.25. The polyol component and the isocyanate component are preferably mixed in a volume ratio of from 5:1 to 1:5, preferably from 4:1 to 1:4, more preferably from about 2:1 to 1:2, even more preferably from about 1.5:1 to 1:1.5. Equivalent weights of the polyol and isocyanate components are therefore preferably established so the desired isocyanate index and volume ratios are met concurrently.

Conditions of the foaming reaction are preferably selected to minimize or avoid the formation of isocyanurate groups during the foaming reaction.

In an aspect of this invention that is of particular interest, the polyurethane foam formulation is dispensed onto a substrate having an open cavity. By "open cavity", it is meant that the portion of the substrate into which the polyurethane foam formulation is dispensed is open to the atmosphere as the foam reacts, expands and cures. The term "cavity" is not intended to imply any particular shape or configuration, other than being open to the atmosphere. The "cavity" may be a substantially planar area, a curved area, a hollow space within the part, or other suitable shape. The cavity may be one that is incapable of retaining a fluid due to its shape or orientation.

Substrates of interest are any part or assembly to which it is desired to attach an adherent polyurethane foam. Of particular interest are vehicle parts and assemblies, especially automobile and truck parts and assemblies in which structural reinforcement, vibration dampening or sound dampening are desired. Examples of such vehicular parts include pillars, rockers, sills, sails, cowls, plenum, seams, frame rails, vehicle sub assemblies, hydro-formed parts, cross car beams and engine cradles. These may be assembled onto a vehicle or vehicle frame when the foam formulation is applied and foamed.

The following example is provided to illustrate the invention, but is not intended to limit the scope thereof. All parts and percentages are by weight unless otherwise indicated.

EXAMPLE 1

An oxazolidone-containing isocyanate component is prepared by mixing 100 parts by weight (0.7 eq.) of a 143 equivalent weight, carbodiimide-modified MDI (Isonate® 143L, from Dow Chemical), 13 parts by weight (0.07 eq.) of a polyepoxide having an epoxy equivalent weight of ~180 (a glycidyl ether of bisphenol A available as D. E. R. 331™ from Dow Chemical), 1.5 parts of triphenyl antimony and 0.5 part of iodine. The mixture is heated to 100° C. for 50 minutes to produce a mixture of about 23 parts of an isocyanate-terminated intermediate having oxazolidone groups and about 90 parts of unreacted starting polyisocyanate (exclusive of catalyst residues). The resulting polyisocyanate component has an isocyanate equivalent weight of approximately 182.

A polyol component is prepared by mixing 80 parts (0.55 eq.) of a toluene diamine-initiated polyether having a hydroxyl number of 391 (Voranol™ 391, from Dow Chemical), 11.5 parts (0.16 eq.) of an amine-initiated polyether polyol having a hydroxyl number of 800 (Voranol™ 800, from Dow Chemical), 4 parts of a carbamate/ethylene glycol mixture containing about 45% by weight ethylene glycol (Specflex NR 566, from Dow Chemical), 0.5 parts of a silicone surfactant, and 2.5 parts (0.28 eq.) of water. The polyol component has an equivalent weight of approximately 100.

The isocyanate and polyol components are mixed at a 42/17 weight ratio, to provide an isocyanate index of 120, and poured into a cup to rise freely and cure.

The mixture foams to form a foam having a density of about 2 pounds/cubic foot (32 kg/m$^3$).

What is claimed is:

1. A method of forming a rigid polyurethane structural reinforcement, vibration dampening or sound dampening foam attached to an open cavity of a vehicular part or assembly, comprising mixing a polyisocyanate component with a polyol component in the presence of a blowing agent and at least one catalyst for the reaction of a polyol with a polyisocyanate, dispensing the resulting mixture into the cavity of the vehicular part or assembly and subjecting the mixture to conditions sufficient to cause it to cure to form a foam having a bulk density of 1.5 to 40 pounds per cubic foot (24-640 kg/m$^3$) that is adherent to the substrate, wherein (a) the polyisocyanate component contains at least one prepolymer containing oxazolidone groups and free isocyanate groups, (b) the polyol component contains isocyanate-reactive materials that have an average functionality of at least about 2.0 and include at least one polyol, and (c) the ratio of isocyanate groups in the polyisocyanate component to the number of isocyanate-reactive groups in the polyol component is from about 0.7:1 to about 1.5:1.

2. The method of claim 1 wherein the polyisocyanate component has an isocyanate equivalent weight of from 150 to 400.

3. The method of claim 2 wherein the polyisocyanate component contains about 0.05 to about 0.33 oxazolidone groups per isocyanate group.

4. The method of claim 3 wherein the polyisocyanate component contains from zero to 0.025 equivalents of isocyanurate groups per equivalent of isocyanate groups.

5. The method of claim 4 wherein the polyisocyanate component contains from zero to 0.01 equivalents of isocyanurate groups per equivalent of isocyanate groups.

6. The method of claim 5 wherein the isocyanate-reactive materials in the polyol component have an average functionality at least 2.5.

7. The method of claim 6 wherein the isocyanate-reactive materials in the polyol component include at least one tertiary amine-containing polyol or amine-functional compound.

8. The method of claim 1 wherein the blowing agent includes at least one carbamate of an alkanolamine.

9. The method of claim 6 wherein the blowing agent includes at least one carbamate of an alkanolamine.

10. The method of claim 7 wherein the blowing agent includes at least one carbamate of an alkanolamine.

11. The method of claim 7 wherein the mixture is essentially devoid of a catalyst for the reaction of isocyanate groups to form isocyanurate groups.

* * * * *